US008723964B2

(12) United States Patent
Wakefield

(10) Patent No.: US 8,723,964 B2
(45) Date of Patent: May 13, 2014

(54) METHOD AND DEVICE FOR COMMUNICATION USING AN OPTICAL SENSOR

(75) Inventor: Ivan N. Wakefield, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2053 days.

(21) Appl. No.: 10/605,172

(22) Filed: Sep. 12, 2003

(65) Prior Publication Data

US 2005/0057669 A1   Mar. 17, 2005

(51) Int. Cl.
*H04N 5/225* (2006.01)
*H04N 9/04* (2006.01)
*H04N 5/222* (2006.01)
*G06K 9/34* (2006.01)

(52) U.S. Cl.
USPC ............. 348/207.99; 348/333.99; 382/176

(58) Field of Classification Search
USPC ............. 709/218; 348/207.99, 239, 333.99; 382/176
See application file for complete search history.

(56) References Cited

U.S. PATENT DOCUMENTS

| 5,734,337 | A | * | 3/1998 | Kupersmit ................ 340/937 |
| 5,813,018 | A | | 9/1998 | Kaji et al. |
| 5,870,093 | A | | 2/1999 | Martin et al. |
| 5,933,823 | A | | 8/1999 | Cullen et al. |
| 5,933,829 | A | | 8/1999 | Durst et al. |
| 5,978,773 | A | | 11/1999 | Hudetz et al. |
| 5,990,930 | A | | 11/1999 | Shibata |
| 6,005,976 | A | | 12/1999 | Naoi et al. |
| 6,058,304 | A | | 5/2000 | Callaghan et al. |
| 6,081,618 | A | | 6/2000 | Naoi et al. |
| 6,108,656 | A | | 8/2000 | Durst et al. |
| 6,118,893 | A | | 9/2000 | Li |
| 6,134,565 | A | | 10/2000 | Hommersom et al. |
| 6,199,048 | B1 | | 3/2001 | Hudetz et al. |
| 6,208,758 | B1 | | 3/2001 | Ono et al. |
| 6,327,387 | B1 | | 12/2001 | Naoi et al. |
| 6,381,352 | B1 | | 4/2002 | Nelson |
| 6,421,469 | B1 | | 7/2002 | Nelson et al. |
| 6,453,069 | B1 | | 9/2002 | Matsugu et al. |
| 6,519,362 | B1 | | 2/2003 | Cusmariu |
| 6,529,230 | B1 | * | 3/2003 | Chong ................ 348/14.01 |

(Continued)

FOREIGN PATENT DOCUMENTS

DE   197 36 809 A1   2/1999
EP   0 851 403 A2   7/1998

(Continued)

OTHER PUBLICATIONS

Transmittal of and The International Preliminary Report on Patentability from the European Patent Office for application No. PCT/IB2004/000941 foreign application corresponding to U.S. Appl. No. 10/605,172.

(Continued)

*Primary Examiner* — Roberto Velez
*Assistant Examiner* — Tuan Le
(74) *Attorney, Agent, or Firm* — Patrick B. Horne; Moore & Van Allen PLLC

(57) ABSTRACT

A device for communication may include an optical sensor to capture an image. A processor may be provided to identify or select a class of data in the image and to perform a predetermined function in response to the class of data.

42 Claims, 11 Drawing Sheets

(56) References Cited

U.S. PATENT DOCUMENTS

| | | | |
|---|---|---|---|
| 6,925,158 B2* | 8/2005 | McNutt | 379/93.34 |
| 7,245,404 B2* | 7/2007 | Bushey et al. | 358/405 |
| 2002/0058536 A1 | 5/2002 | Horii et al. | |
| 2002/0062382 A1* | 5/2002 | Rhoads et al. | 709/228 |
| 2002/0090108 A1* | 7/2002 | Rhoads | 382/100 |
| 2002/0102966 A1* | 8/2002 | Lev et al. | 455/412 |
| 2003/0076408 A1* | 4/2003 | Dutta | 348/61 |
| 2003/0120555 A1* | 6/2003 | Kitagawa | 705/26 |
| 2004/0208372 A1* | 10/2004 | Boncyk et al. | 382/181 |
| 2004/0257457 A1* | 12/2004 | Stavely et al. | 348/333.01 |
| 2005/0038872 A1* | 2/2005 | Ono et al. | 709/218 |
| 2005/0044179 A1* | 2/2005 | Hunter | 709/218 |
| 2005/0050165 A1* | 3/2005 | Hamynen | 709/218 |

FOREIGN PATENT DOCUMENTS

| | | |
|---|---|---|
| EP | 1073002 A2 | 6/2000 |
| EP | 2002/111841 | 4/2002 |
| EP | 2002/252691 | 9/2002 |
| JP | 200241383 A | 2/2002 |
| JP | 2002111841 A | 4/2002 |
| JP | 2002152696 A | 5/2002 |
| JP | 2002176674 A | 6/2002 |
| JP | 2002252691 A | 9/2002 |
| JP | 2003150488 A | 5/2003 |
| JP | 2003152829 A | 5/2003 |
| WO | WO 0033493 A1 * | 6/2000 |
| WO | WO 0167326 A1 * | 9/2001 |

OTHER PUBLICATIONS

Takashi Tomita, Official Action, Jan. 19, 2010, 4 pgs.
Patent Office of the People's Republic of China, First Office Action, Mar. 9, 2007.
Indian Patent Office, First Examination Report, Feb. 16, 2010, 2 pgs.
PCT International Search Report, PCT/IB2004/000941, Jul. 12, 2004.
PCT Written Opinion of the International Searching Authority, Jul. 12, 2004.

* cited by examiner

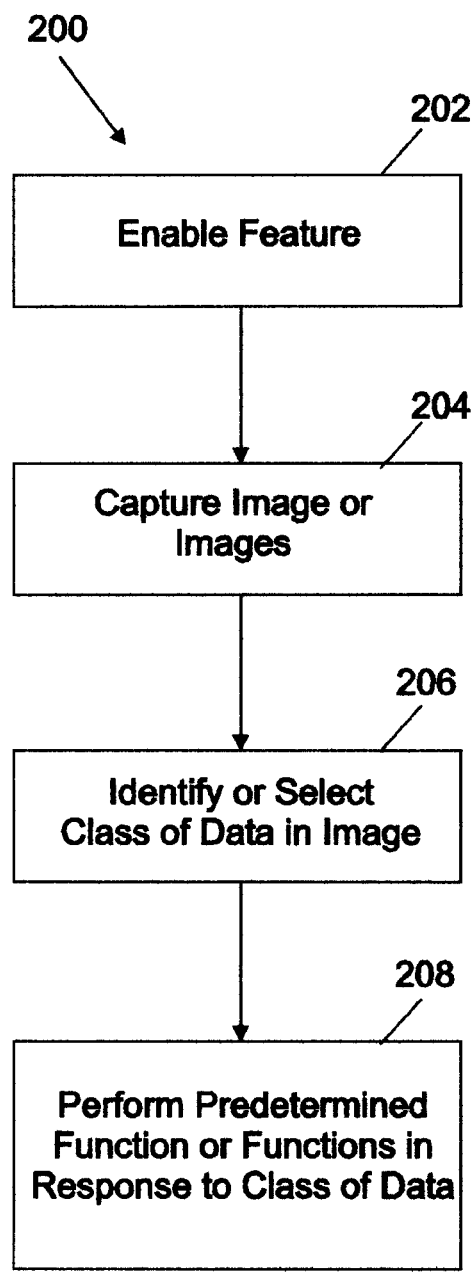
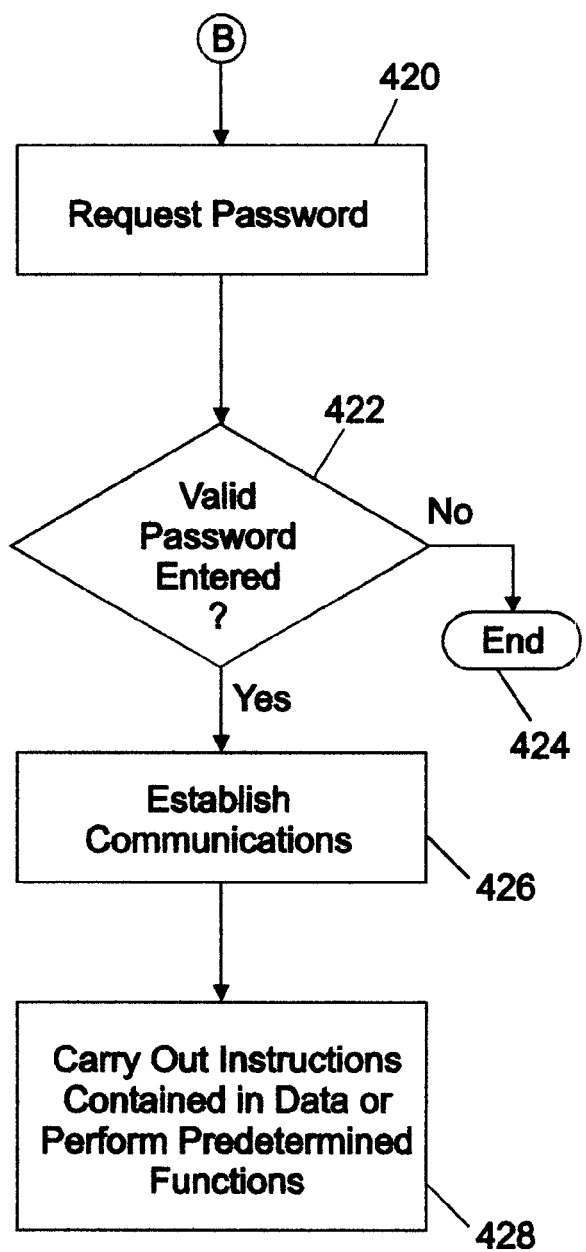

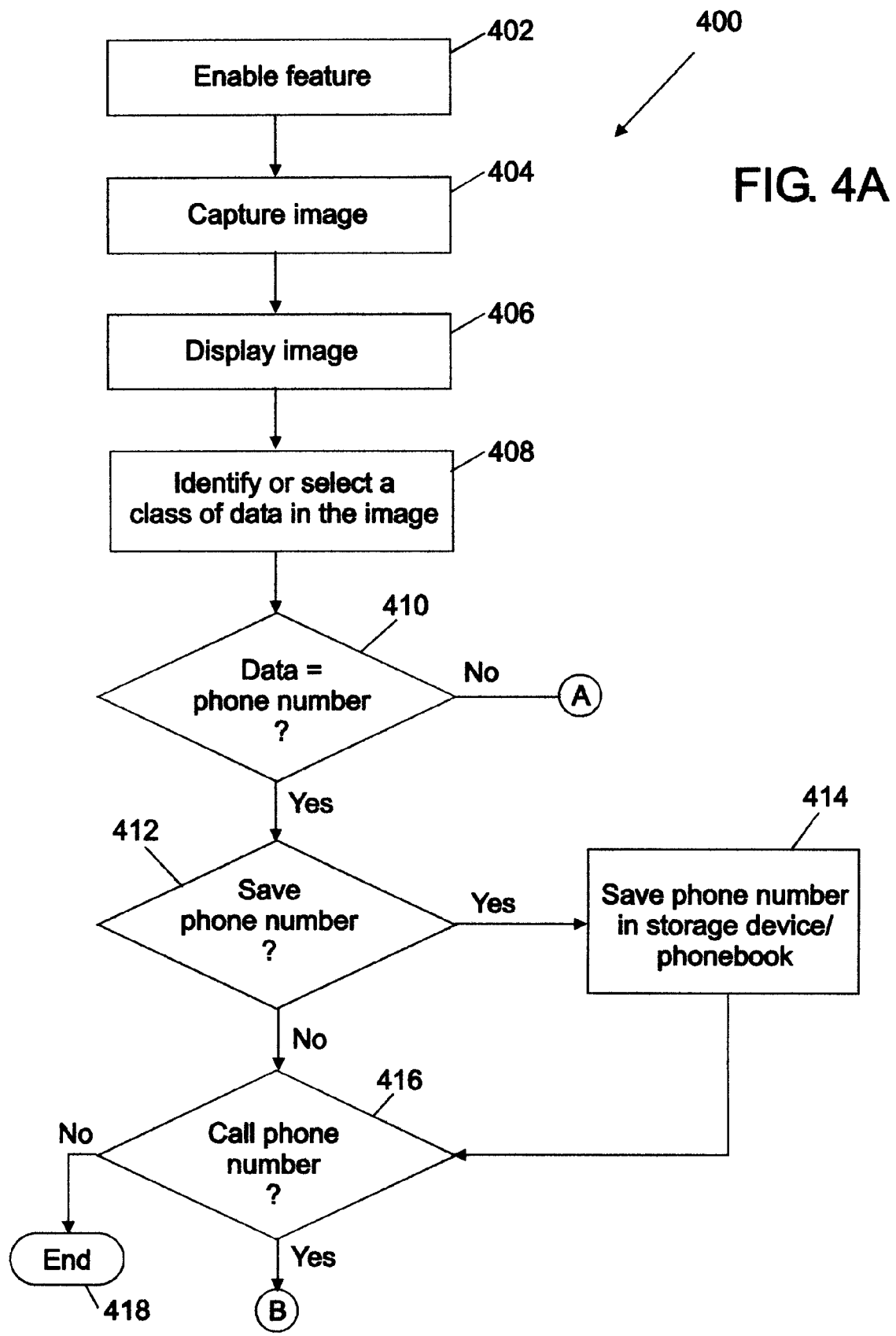

METHOD AND DEVICE FOR COMMUNICATION USING AN OPTICAL SENSOR

BACKGROUND OF INVENTION

The present invention relates to communication methods and devices, and more particularly to a method and device for communication using an optical sensor, charge coupled device, camera or the like.

Communication devices, including wireless communication devices, such as cellular telephones and the like are becoming feature rich devices. Many of the latest cellular telephone models can surf the Internet, transmit and receive data including emails, text messages and the like in addition to normal voice communications. One of the latest features to be associated with or incorporated into wireless communication devices, cellular telephones and the like are digital cameras. These cameras can be built into the communication device or may be a separate module that can be electrically coupled to the communication device. A camera equipped communication device that also has Internet and email capability can capture images and transmit such images via the Internet, email or via other media. Besides being a novelty, digital cameras or optical sensors associated with a communication device provide a way to communicate with the communication device or cell phone optically in addition to wired and wireless means, such as infrared (IR) and radio frequency (RF). IR and RF communication, such as Bluetooth, Wireless Fidelity (WiFi) and the like, however, each require an active transmitting device that is operated in real-time and requires that the communication device be within range.

SUMMARY OF INVENTION

In accordance with an embodiment of the present invention, a device for communication may include an optical sensor to capture an image. The device may also include a processor to identify or select a class of data in the image and to perform a predetermined function in response to the class of data.

In accordance with another embodiment of the present invention, a device for communication may include an optical sensor to capture an image. A processor may also be provided. A data structure operable in association with one of the optical sensor, the processor or a mobile system may include computer-executable instructions to identify or select a class of data in the image. Another data structure operable in association with the processor may be provided to perform a predetermined function in response to the class of data. The device may also include a transmitter to transmit signals in response to the class of data. In one embodiment of the present invention, the transmitter may transmit signals in response to the data to order a product or service.

In accordance with another embodiment of the present invention, a device for communication may include a microphone to receive an acoustic signal. The device may also include a processor to decode a class of data from the acoustic signal and to perform a predetermined function in response to the class of data.

In accordance with another embodiment of the present invention, a method for communication may include capturing an image and identifying or selecting a class of data in the image. The method may further include performing a predetermined function in response to the class of data.

In accordance with another embodiment of the present invention, a method for communication may include receiving an acoustic signal and identifying or selecting a class of data from the acoustic signal. A predetermined function may be performed in response to the class of data.

In accordance with another embodiment of the present invention, a computer-readable medium having computer-executable instructions for performing a method may include capturing an image and identifying or selecting a class of data in the image. The method may further include performing a predetermined function in response to the class of data.

BRIEF DESCRIPTION OF DRAWINGS

FIG. 2 is a flow chart of an example of a method for communication in accordance with an embodiment of the present invention.

FIGS. 4A, 4B, 4C, 4D, 4E and 4F (collectively FIG. 4) are a flow chart of an example of a method for communication in accordance with another embodiment of the present invention.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1A:
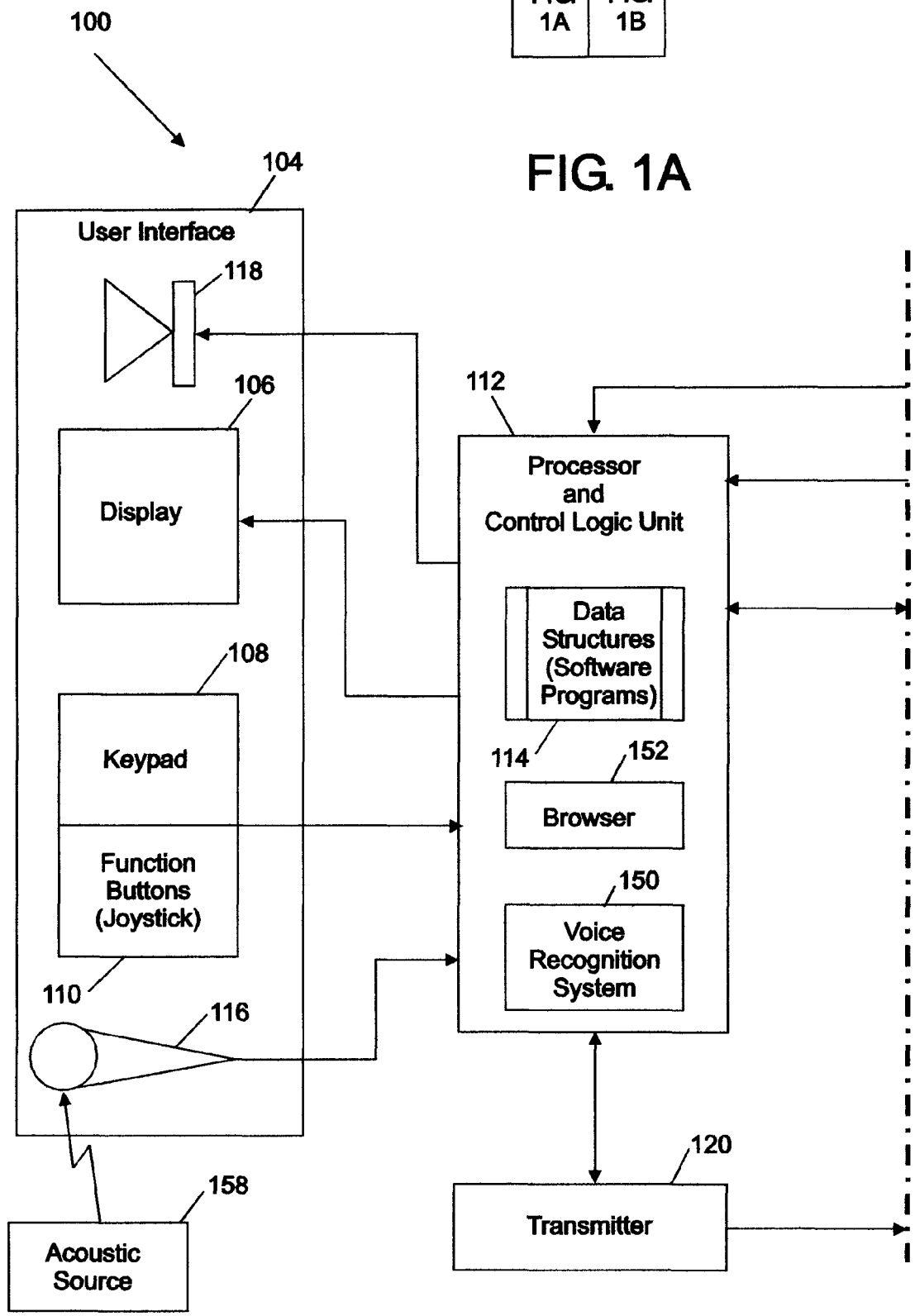
FIGS. 1A and 1B (collectively FIG. 1) is a block diagram of a device for communication and system or medium for communication in accordance with an embodiment of the present invention.
Figure 1B:
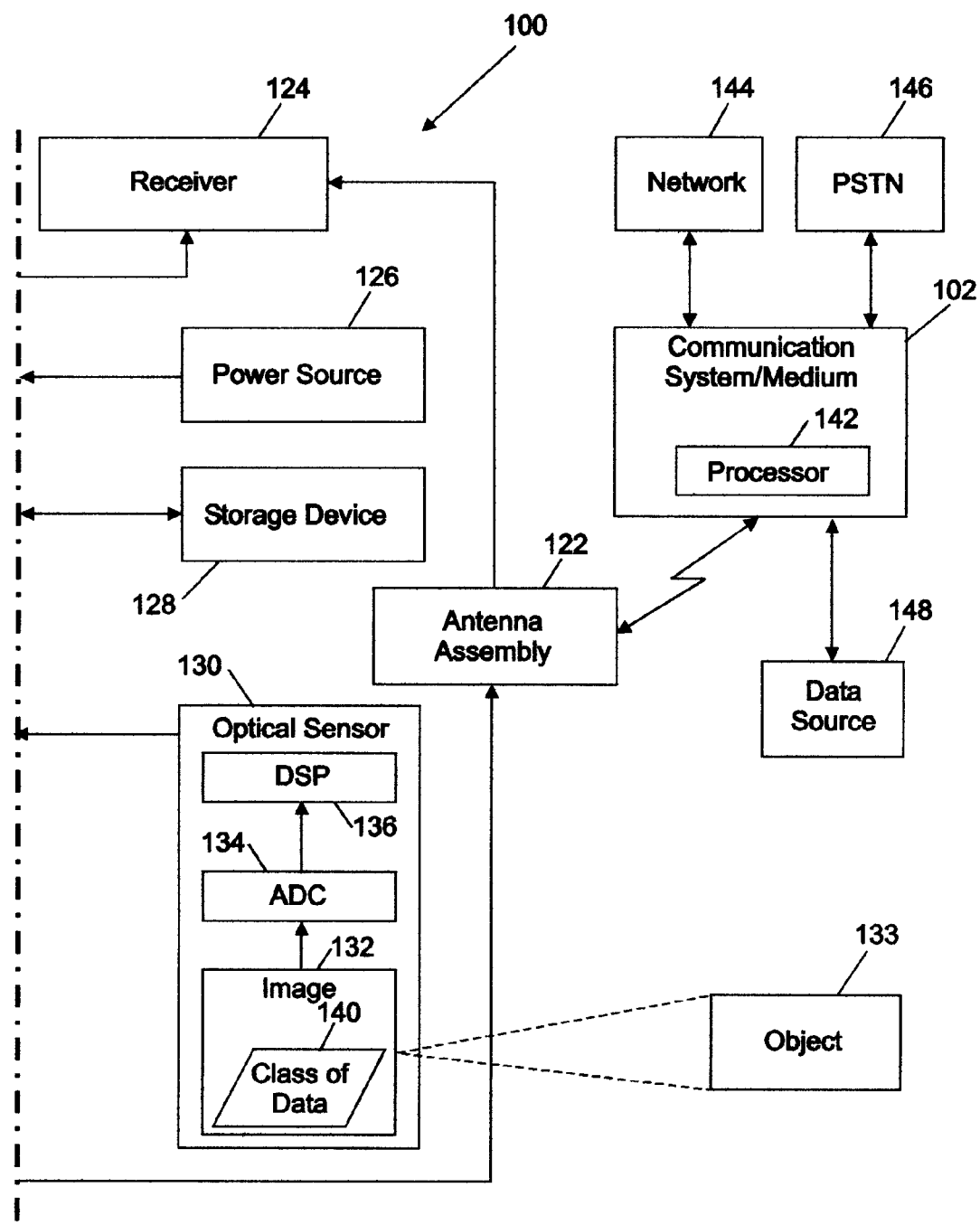

FIG. 1 is a block diagram of a communication device 100 operable in association with a communication system or medium 102 in accordance with an embodiment of the present invention. The communication system or medium 102 may be a mobile, wireless, cellular communication system or similar system. The communication device 100 may be a cordless telephone, cellular telephone, personal digital assistant (PDA), communicator, computer device or the like and is not unique to any particular communication standard, such as Advanced Mobile Phone Service (AMPS), Digital Advanced Mobile Phone Service (D-AMPS), Global System for Mobile Communications (GSM), Code Division Multiple Access (CDMA) or the like. The layout illustrated in FIG. 1 is for purposes of explaining the present invention and the present invention is not limited to any particular design.

The communication device 100 may include an operator or user interface 104 to facilitate controlling operation of the communication device 100 including initiating and conducting phone calls and other communications. The user interface 104 may include a display 106 to provide visual signals to a subscriber or user as to the status and operation of the communication device 100. The display 106 may be a liquid crystal display (LCD) or the like capable of presenting color images. The display 106 may provide information to a user or operator in the form of images, text, numerals, characters, a graphical user interface (GUI) and the like. The user interface 104 may also include a keypad 108 and function keys or buttons 110 including a point device, such as a joystick or the like. The keypad 108, function buttons and joystick 110 permit the user to communicate commands to the communication device 100 to dial phone numbers, initiate and terminate calls, establish other communications, such as access to the Internet, send and receive email, text messages and the like. The keypad 108, function buttons and joystick 110 may also be used to control other operations of the communication device 100.

The display 106, keypad 108, and function buttons 110 may be coupled to a main processor and control logic unit 112. The main processor and control logic unit 112 may be a microprocessor or the like. The main processor and logic unit 112 may include data structures 114, software programs, computer applications and the like to encode and decode control signals, perform communication procedures and other functions as described herein.

The user interface 104 may also include a microphone 116 and a speaker 118. The microphone 116 may receive audio or acoustic signals from a user or from an acoustic source 120, such as a radio, television or the like. The microphone 116 may convert the audio or acoustic signals to electrical signals. The microphone 116 may be connected to the main processor and logic unit 112 wherein the main processor and logic unit 112 may convert the electrical signals to baseband communication signals. The main processor and control logic unit 112 may be connected to a transmitter 120 that may convert baseband signals from the main processor and control logic unit 112 to radio frequency (RF) signals. The transmitter 118 may be connected to an antenna assembly 122 for transmission of the RF signals to the communication medium or system 102.

The antenna assembly 122 may receive RF signals over the air and transfer the RF signals to a receiver 124. The receiver 124 may convert the RF signals to baseband signals. The baseband signals may be applied to the main processor and control logic unit 112 which may convert the baseband signals to electrical signals. The processor and control unit 112 may send the electrical signals to the speaker 118 which may convert the electrical signals to audio signals that can be understood by the user.

A power source 126 may be connected to the main processor and control logic unit 112 to provide power for operation of the communication device 100. The power source 126 may be a rechargeable battery or the like. The communication device 100 may also include at least one data storage device 128. The data storage device 128 may store lists of phone numbers. Examples of the lists may include phone numbers entered and stored by action of the user, such as in a phonebook portion of the storage device 128, phone numbers for calls that have been missed or not answered, phone numbers that have been called by the communication device 100 and the like. The data storage device 128 may be a computer-readable medium to store computer-executable or computer-usable instructions or data structures, such as data structures 114, to perform special operations or functions such as those described in accordance with embodiments of the present invention.

An optical sensor 130 to capture images of objects or the like, such as image 132 of object 133, may be integrated as part of the communication device 100 or may be a separate unit or device that is connectable to the communication device 100 to transmit the captured images. The object 133 may be an image on a television screen, video monitor, or any type of fixed medium or printed material. The optical sensor 130 may be a digital camera, complimentary metal oxide semiconductor (CMOS) device, charge coupled device (CCD) or similar device. The optical sensor 130 may include an analog-to-digital converter (ADC) 134 to convert electrical signals corresponding to an image, such as image 132, received by the CMOS device, CCD or the like to digital signals. The ADC 134 may transfer the digital signals to a digital signal processor (DSP) 136. The DSP 136 may include a data structure or software program to manipulate digitized photographic images. The DSP 136 may adjust the contrast and detail in the image 132 and may compress the data that makes up the image 132 so that the image data occupies less storage space or bandwidth when stored in a storage device, such as storage device 128, or transmitted via the communication system 102.

The image 132 may include a class of data 140 or predetermined type of data that may be used to command or instruct the communication device 100 to perform a predetermined function or operation in response to the class of data 140. Examples of the class of data 140 may include but is not limited to phone numbers, bar codes, access information to a web site, an email address a sequence of commands to be performed by the communication device 100, information associated with a product or service, combinations of any of the preceding or other data or information. The processor and control logic unit 112 may identify or select the class of data 140 and perform the predetermined function or operation. A data structure, such as one of data structures 114, may include computer-executable instructions, executable by the processor 112 to identify or select the class of data 140. The processor 112 may execute the instructions to decode pixels in the image 132 to identify or select the class of data 140. The class of data 140 may be a unique symbol or character to minimize the computational burden by the processor 112 in analyzing or decoding pixels and identifying the class of data 140. The unique symbol or character may also be a selected color or predetermined location in the image 132 to further reduce computational overhead in identifying or selecting the class of data 140. The color and location of the symbol or character may also constitute a shorthand signal to the processor 112 to perform a particular operation or function. Other methods to identify, select or extract information, data, text or the like from an image are known, such as the method described in U.S. Pat. No. 6,519,362, entitled "Method of Extracting Text Present in a Color Image" or U.S. Pat. No. 5,990,930, entitled "Image-Area Extracting Method for Visual Telephone."

The image 132 and class of data 140 may be visible to the human eye and may be displayed in the display 106. The class of data 140 may also include data or information that is unintelligible to the human eye under some circumstances. For example the class of data 140 may be subliminal, formed using steganography, watermarking or the like. The class of data 140 may be automatically identified or selected by the processor 112 in some circumstances. In other embodiments or under other circumstances the user may select the class of data 140 in the image 132, if visible. The user may select the class of data 140 using the keypad 108, function buttons or joystick 110. The user may also edit the class of data 140 using the keypad 108, function buttons or joystick 110 and store or transmit the data 140.

In another embodiment of the present invention, a data structure, similar to data structures 114, or computer-executable instructions to analyze the image 132 to identify or select the class of data 140 may be executable by the optical sensor 130. In a further embodiment, the digitized image 132 may be transmitted to the communication system 102 for analysis of the image 132. The communication system 102 may include a processor 142 or the like that may include a data structure or computer-executable instruction to perform image analysis and to identify or select the class of data 140. The image analysis may be performed by the system 102 to conserve computational overhead in the communication device 100 in analyzing the image or when an extensive pixel analysis may be performed. The class of data 140 may then be returned to the communication device 100 to carry out any predetermined functions or operations.

Examples of the predetermined functions or operations that may be performed by the communication device 100 in response to identifying or selecting the class of data 140 may include but is not necessarily limited to ordering a product or service; decoding data from one or more images to reprogram the communication device 100; downloading communication device setup parameters; storing one or more phone numbers; establishing a call or other communications; storing information associated with a web site or email address; accessing a web site; sending an email message and similar operations. The communication device 100 may be connectable to a network 144, such as the Internet or other network, via the communication system 102 to access web sites and send and receive emails, text messages and other communications. The communications device 100 may also be connectable to a public switched telephone network (PSTN) 146 or to another mobile system (not shown in FIG. 1) via the communication system 102 in which the communication device 100 is currently operating.

The communication device 100 may also be connectable to a data source 148 via the communication system 102. The data source 148 may be the Internet or other repository for information or data that may be sent or downloaded to the communication device 100 in response to operations or functions related to the class data 140 identified or selected in the image 132. For example, the data source 148 may include information about a product or service that may be sent to a user in making a purchasing decision.

The communication medium or system 102 may be a network, such as the Internet, private network or the like. The communication system 102 may include one or more terrestrial communication channels or links and one or more aerospace communication channels or links. In other embodiments, the communication system 102 may be any communication system including by way of example, dedicated communication lines, telephone networks, wireless data transmission systems, two-way cable systems, customized computer networks, interactive kiosk networks and the like.

The communication device 100 may also include a voice recognition system 150 or function. The voice recognition system 150 may be embodied in hardware, software, firmware, a combination thereof or the like and may operate in association with the processor and control logic unit 112. The voice recognition system 150 may be coupled to the microphone 116 to permit a user or operator to control operation of the communication device 100 by voice commands to establish communications or perform other operations or functions. The microphone 116 may also receive acoustic or audio signals from any acoustic source 158 to control operation of the communication device 100 and establish communications similar to that described above with respect to optical signals or images received by the optical sensor 130. Examples of the acoustic source 158 may be a television, radio, human voice or the like. Accordingly, the communications device 100 may receive optical signals or images or acoustic signals to control operation of the communication device 100 to perform predetermined functions in response to a class of data.

The communication device 100 may also include a browser 152 to access the Internet. The browser 152 may operate on the processor and control logic unit 112. The browser 152 may be similar to Netscape®, Microsoft® Internet Explorer or the like.

FIG. 2 is a flow chart of an example of a method 200 for communication in accordance with an embodiment of the present invention. The method 200 may be embodied in a communication device, such as device 100 of FIG. 1, in the form of a data structure, such as one of the data structures 114, to perform predetermined functions in response to a class of data or predetermined set or group of data identified or selected from an image of an object. In block 202, the feature or method 200 may be enabled or activated by a user or operator of the communication device. The feature or method 200 may be enabled by selecting the feature in a menu presented to the user in a display, such as display 106. In block 204, an image or images of an object or objects may be captured. In block 206, a class of data or predetermined set of data in the image may be identified or selected. As described with respect to the communication device 100 in FIG. 1, the class of data may be automatically identified or selected by analysis of the image. In another embodiment of the present invention or because of circumstances, the class of data or data of interest may be selected by a user using a keypad, function buttons or the like, similar to keypad 108 or function buttons 110 of communication device 100 of FIG. 1. Examples of the class of data or data of interest in the image may include but are not limited to: a phone number, list of phone numbers, a bar code, access information to a web site, a sequence of commands, information associated with a product or service and the like. If the class of data is a sequence of commands, the commands may be performed automatically, or in another embodiment of the present invention, the user may be requested to enter a valid password or code. The class of data may also be a unique symbol or character, as previously described, that when identified or selected may instruct the communication device to perform a predetermined function or functions. In block 208, the predetermined function or functions may be performed by the communication device in response to the class of data. Examples of the predetermined function or functions may include but are not limited to: transmitting a signal or signals to order a product or service, decoding data from one or more images to reprogram the communication device, downloading communication setup parameters, storing one or more phone numbers, establishing communications or a call, storing information associated with a web site or email address, accessing a web site, sending an email or text message or the like. If the predetermined function or operation involves transmitting a signal or message, the message may be formulated and send by the communication device by short message service (SMS), email, text messaging, voice or data communication.

Figure 3A:
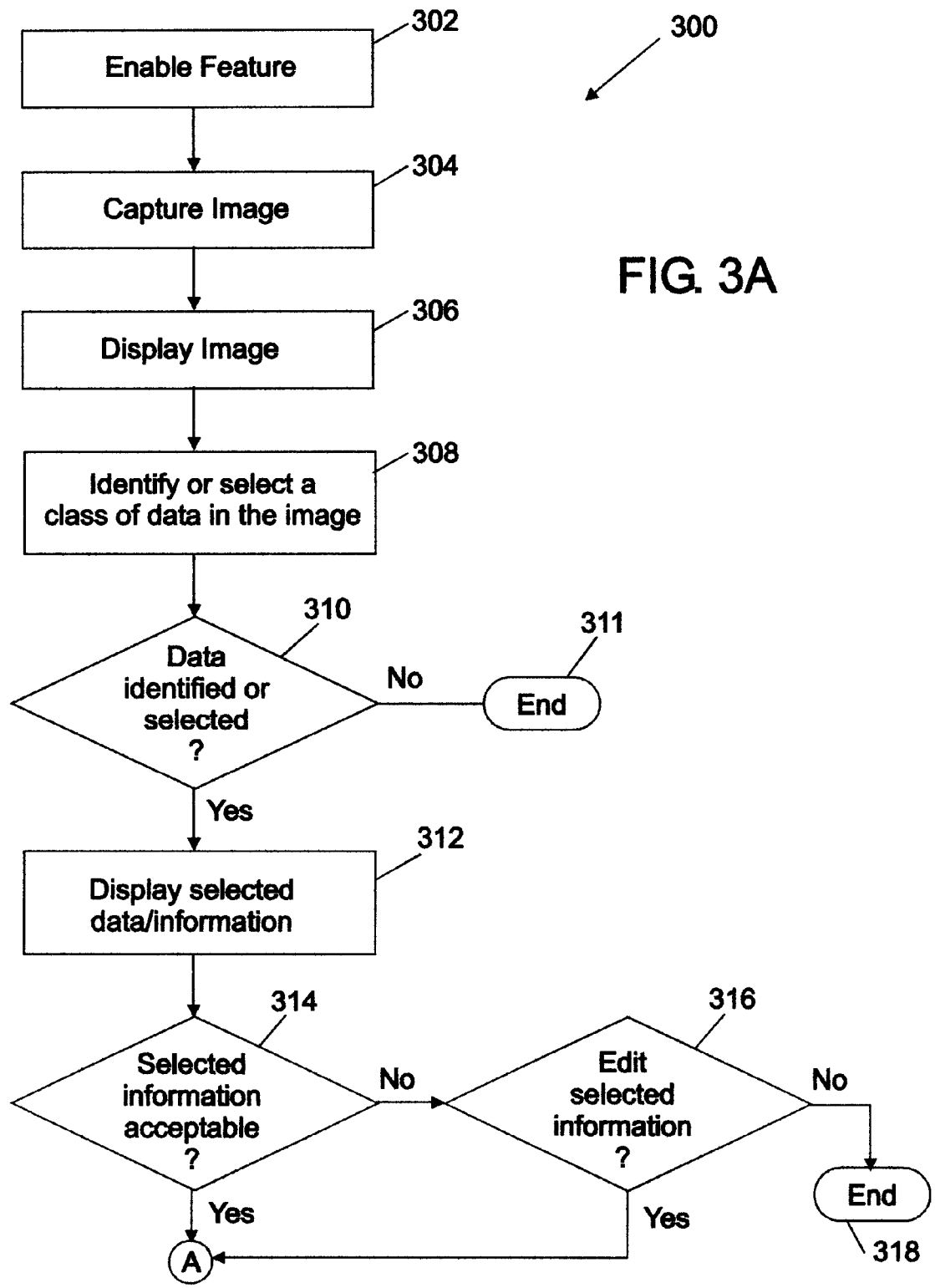
FIGS. 3A and 3B (collectively FIG. 3) are a flow chart of an example of a method for communication in accordance with another embodiment of the present invention.
Figure 3B:
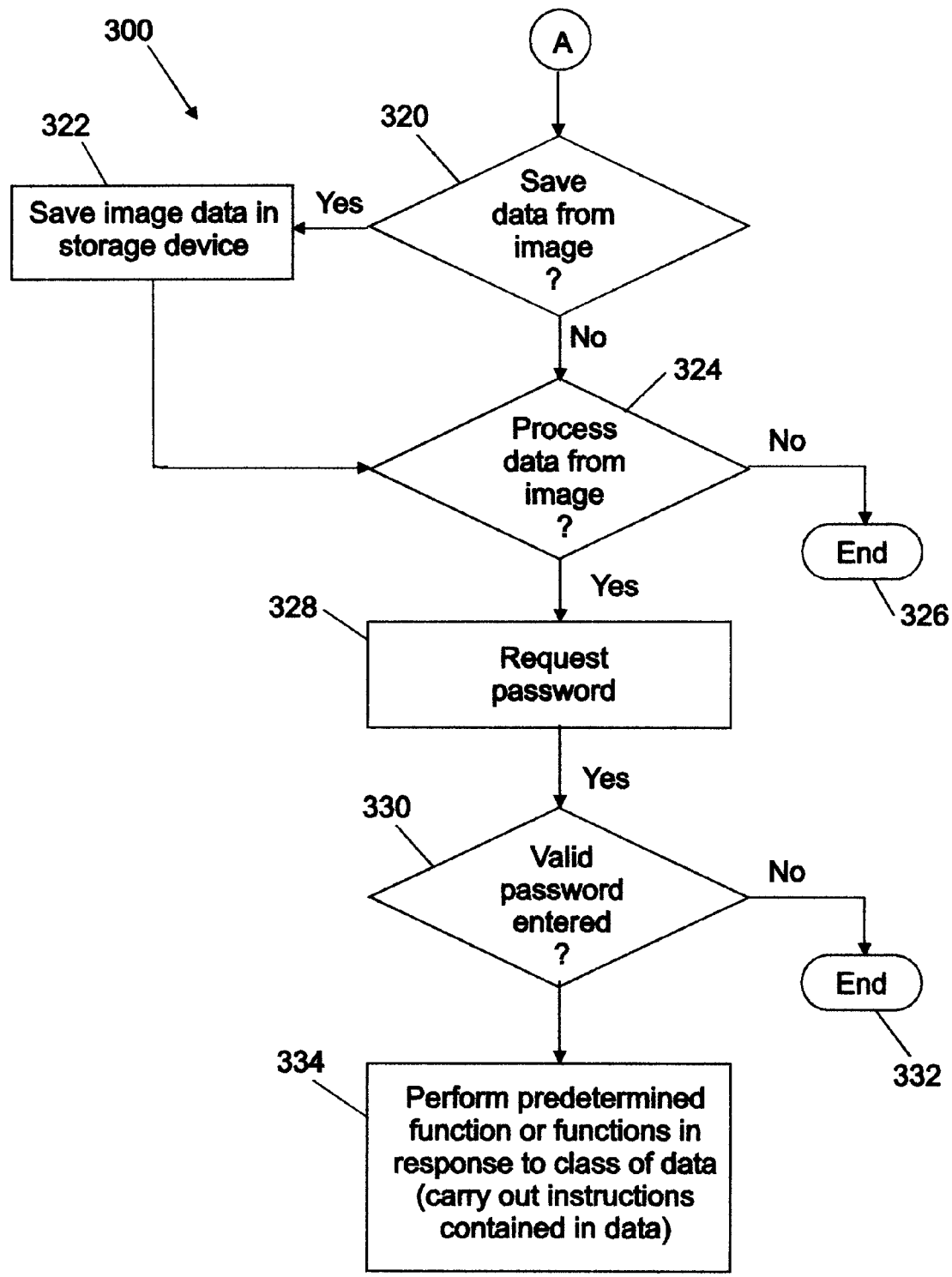

FIGS. 3A and 3B are a flow chart of an example of a method 300 for communication in accordance with another embodiment of the present invention. The method 300 may be embodied in a communication device, such as device 100 of FIG. 1 in the form of a data structure, such as one of the data structures 114, to perform predetermined functions in response to a class of data or predetermined set or group of data identified or selected from an image of an object. In block 302, the feature or method 300 may be enabled or activated. The method 300 may be enabled by a user selecting the feature in a menu that may be presented on a display, such as display 106 (FIG. 1). In block 304, the image may be captured and in block 306, the image may be displayed on a display, such as display 106. In block 308, a class of data may be identified or selected in the image similar to that previously described. In decision block 310, a determination may be made whether data was selected or identified in block 308. If data was not selected or identified in block 308, the method 300 may be ended at termination 311. If data was identified or selected in block 308, the method 300 may advance to block 312 where the selected data or information may be displayed. In block 314, a user may select whether the displayed information or data is acceptable or that which is desired. If not, the information may be edited in block 316. If the information or data is not edited in block 316, the method 300 may be terminated at termination 318. If the data or information is acceptable in block 314 or edited in block 316, the user may be presented the option of saving the data or information in block 320. If the user responds affirmatively, the image data may be saved in a storage device in block 322. The image data may be stored in a storage device, such as storage device 128 in FIG. 1. After saving the data in block 322 or electing not to save the data in block 320, the user may be presented the option to process in data from the image in block 324. If the user elects not to process the data, the method 300 may be terminated at termination 326. If the user elects to process the data in block 324, the user may be requested to enter a password in block 328. In decision block 330, a determination may be made whether the entered password is valid. If the password is invalid, the user may be notified and given an opportunity to enter the valid password (not shown in FIG. 3). Alternatively, if the password is invalid or after a predetermined number of attempts to enter a valid password, the method 300 may end at termination 332. If the password entered is valid, the predetermined function or functions may be performed in block 334 in response to the class of data identified or selected in block 308. The predetermined function or functions may involve carrying out instructions contained in the data by the communication device.

FIGS. 4A, 4B, 4C, 4D, 4E and 4F are a flow chart of an example of a method 400 for communication in accordance with another embodiment of the present invention. The method 400 may be embodied in the communication device 100 of FIG. 1 in the form of a data structure, such as one of data structures 114, to perform predetermined functions in response to a class of data identified or selected from an image. In block 402, a communication device, such as device 100 (FIG. 1), may be enabled to perform the feature or method 400. In block 404, an image of an object may be captured by an optical device, such as optical device 130 or the like. The image may be displayed in block 406. In block 408, a predetermined class of data may be selected or identified in the image similar to that previously described. In block 410, a determination may be made automatically or by the user if the data corresponds to a phone number. If the data is determined to be a phone number in block 412, an audio message from a speaker, like speaker 118 of FIG. 1 or a visual message displayed on a display, like display 106, may ask if the user wants to save the phone number in block 412. If the user responds affirmatively in block 412, the phone number may be saved in a storage device similar to storage device 128 or the like and may be stored in a phonebook portion of the storage device 128. Whether the phone number is saved or not, the user may be prompted by an audio or visual message if the user wants to call the number in block 416. If the user responds negatively, the method 400 may be terminated at termination 418. If the user responds positively in block 416, the user may be requested to enter a password in block 420. In block 422, a determination may be made if a valid password has been entered. The user may be given a predetermined number of attempts to enter a valid password before the method 400 may be terminated at termination 424. If a determination is made that a valid password was entered in block 422, communications may be established or the call initiated in block 426. The selected or identified data may also include instruction that may be performed by the communication device in response to the class of data in block 428.

Returning to block 410 (FIG. 4A), if a determination is made that the data is not a phone number, the method 400 may advance to block 430 (FIG. 4C), where a determination may be made whether the data is a bar code. If the data is a bar code, information corresponding to the bar code may be accessed in block 432. The information corresponding to the bar code may be accessed by a communication device, such as device 100, accessing a web page, data source or the like as previously discussed. The information corresponding to the bar code may be displayed or presented to the user in block 434. In block 436, the user may be prompted if he wants to save the information. The user may be prompted by a message displayed on a display, such as display 106 of FIG. 1 or by an audio signal from a speaker, such as speaker 118. The information may be saved in block 438 if the user responds affirmatively to block 436. In block 440, a user may be prompted by an audio or visual message whether he wants to initiate a request or purchase, if the identified or selected class of data or information is related to a product or service. If the user responds no in block 440, the method 400 may end at termination 442. If the user responds yes in block 440, the user may be requested to enter a password in block 444. A check may be performed in block 446 as to whether the entered password is valid. The method 400 may end at termination 448 if the password is invalid or the user fails to enter a valid password after a predetermined number of attempts. If the entered password is valid in block 446, communications may be established if not already in block 450. In block 452, the requestor or purchaser's information may be transmitted to a seller or provider. The purchaser information may include contact information, such as mailing address, email, phone number and the like and other information, such as credit card number or other means for buying a product or service.

Figure 4C:
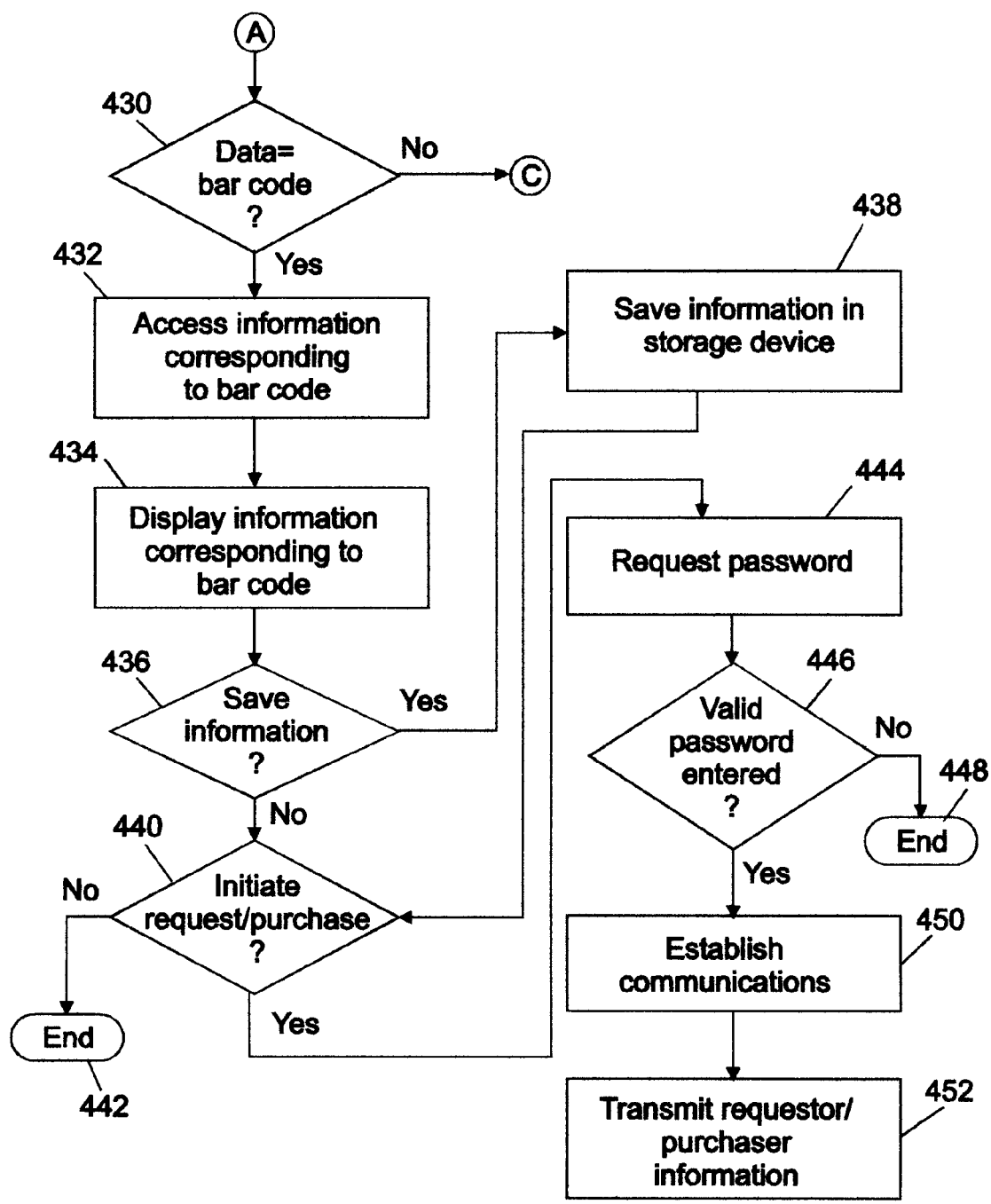
Figure 4D:
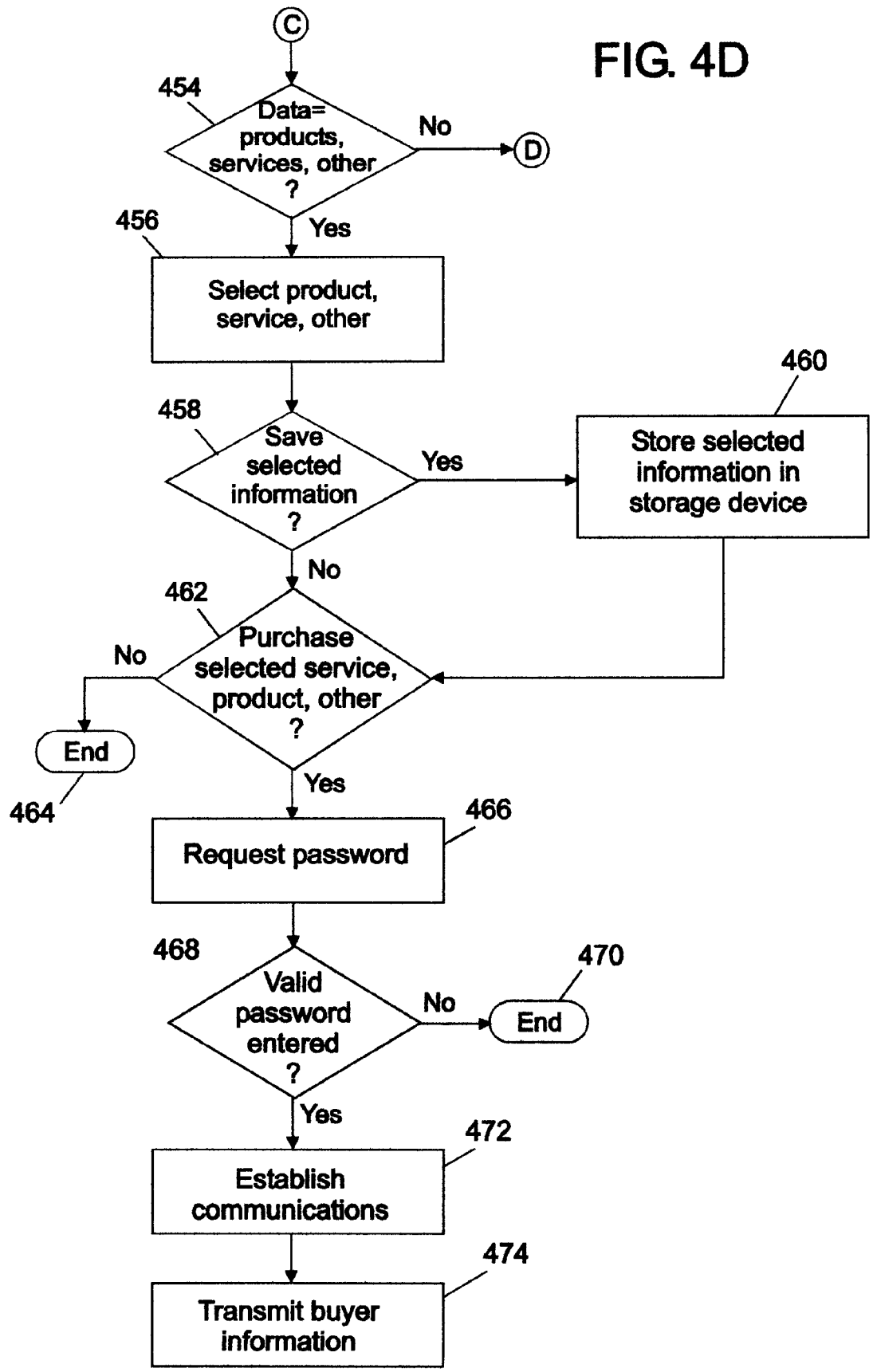

Returning to block 430, if the data is not a bar code, the method 400 may advance to block 454 (FIG. 4D). In block 454, a determination may be made if the data is related to a product, service or other item. If the data is related to such items in block 454, a selection of a product, service or other item may be made by a user or purchaser in block 456. The available products, services or the like may be displayed, such as on display 106 of FIG. 1, for a user or purchaser to make selections. In block 458, the user may be prompted visually, audibly or a combination thereof, if he desires to save information related to the selected product, service or the like. If the response is yes, the selected information may be stored in a storage device, such as storage device 128 (FIG. 1) in block 460. Whether the user decides to store the selected information in block 458, the user may be prompted whether he desires to purchase or order the selected product, service or the like in block 462. If the response is no to the prompt in block 462, the method 400 may end at termination 464. If the response is yes to the prompt in block 462, the user may be requested to enter a password in block 466. A determination may be made in block 468 if the entered password is valid. If the password is invalid or the user fails to enter a valid password after a predetermined number of attempts, the method 400 may be terminated at termination 470. If a valid password is entered, communications may be established in block 472 and a buyers information may be transmitted to a seller or provider in block 474. As previously discussed, the buyer information may include contact information, such as mailing address, email address, phone number and credit card or other purchase information if required.

Figure 4E:
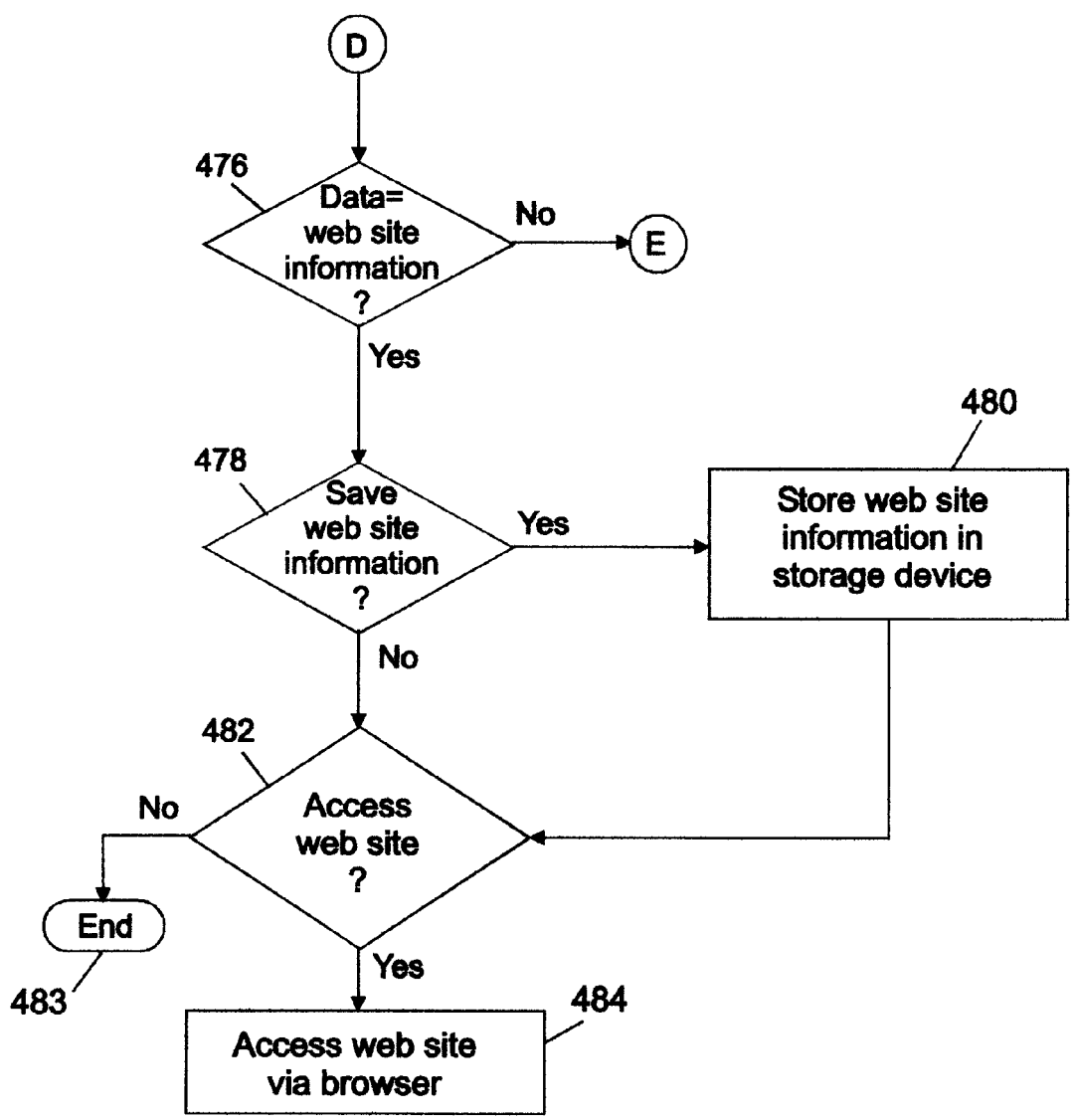

Returning to block 454 (FIG. 4D), if the data is not related to a product, service or other item, the method 400 may advance to block 476 (FIG. 4E). In block 476, a determination may be made if the identified or selected class of data in block 408 (FIG. 4A) is web site information. If the response in block 476 is yes, a user may be prompted in block 478 whether to save the web site information. If the response is affirmative, the web site information may be stored in block 480. In block 482 a user may be prompted whether to access the web site. If the response is no, the method 400 may be ended at termination 483. If the response is yes, the web site may be accessed via a browser, such as the browser 152 in FIG. 1.

Figure 4F:
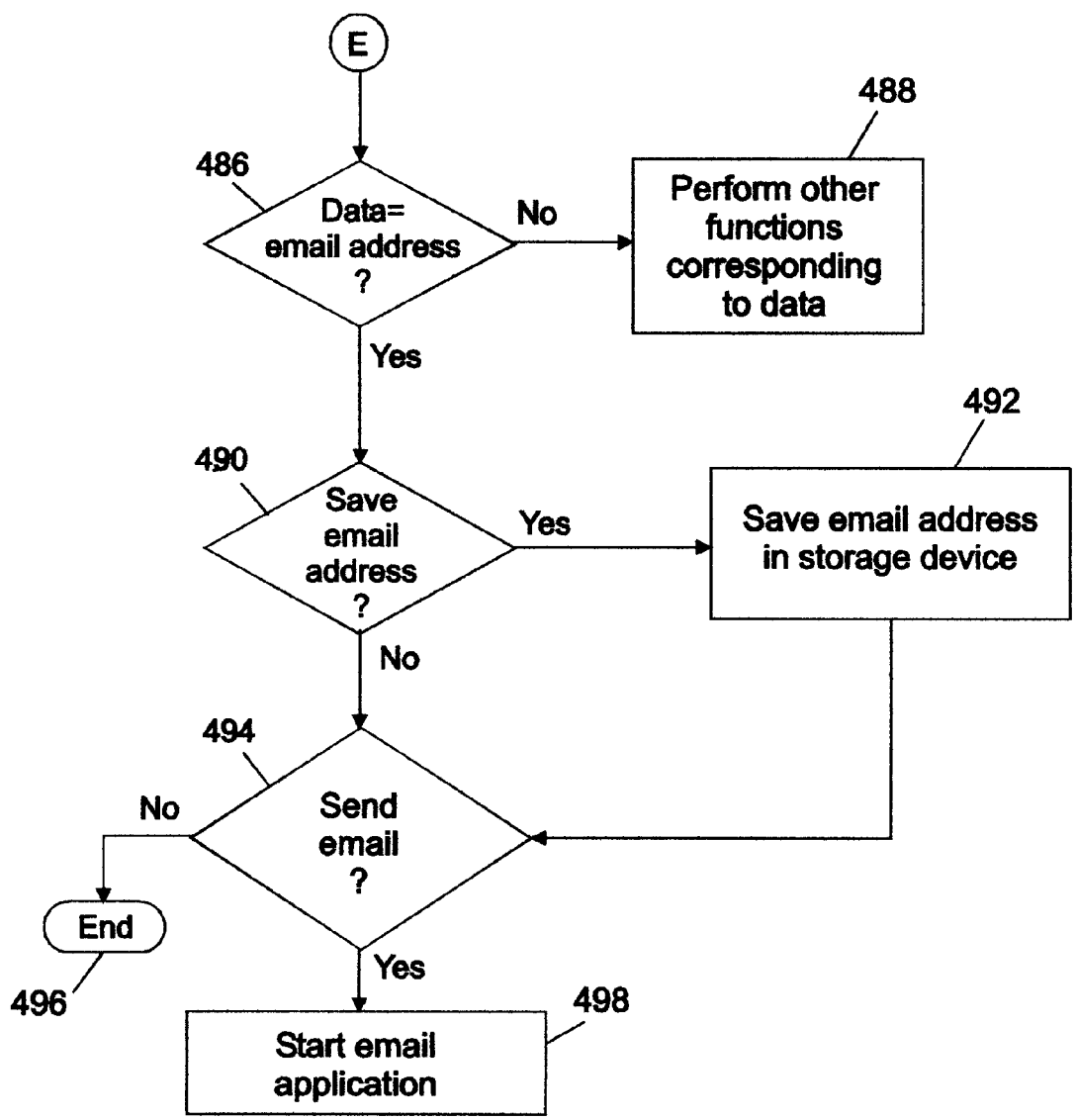

Returning to block 476 (FIG. 4E), if the data is not information to access a web site, the method 400 may advance to block 486 (FIG. 4F). In block 486, a determination may be made if the identified or selected data corresponds to an email address. If the data is not an email address in block 486, the method may advance to block 488. In block 488, other functions corresponding to the class of data identified or selected in block 408 may be performed. If the data is an email address in block 486, the user may be prompted to save the email address in block 490. If the user responds affirmatively, the email address may be saved in a storage device similar to storage device 128 in FIG. 1 in block 492. In block 494, the user may be prompted if he wants to send an email. If not, the method 400 may end at termination 496. If the user responds that he does desire to send an email in block 494, an email application or the like may be started in block 498 for the user to compose and transmit an email. The email application may be part of that data structures 144 illustration in FIG. 1.

The different operations or functions described with reference to FIG. 4 need not be performed in any particular order and the order depicted is merely coincidental for purposes of describing the present invention. Any prompt in FIG. 4 where the user may be requested to make a selection or enter information, a password or the like may be responded to by the user operating a keypad or function buttons similar to keypad 108 or function button 110 of FIG. 1. Alternatively, the user may respond to any prompt acoustically using a voice recognition system or the like, such as voice recognition system 150 of FIG. 1, if the communication device is so equipped.

Figure 5:
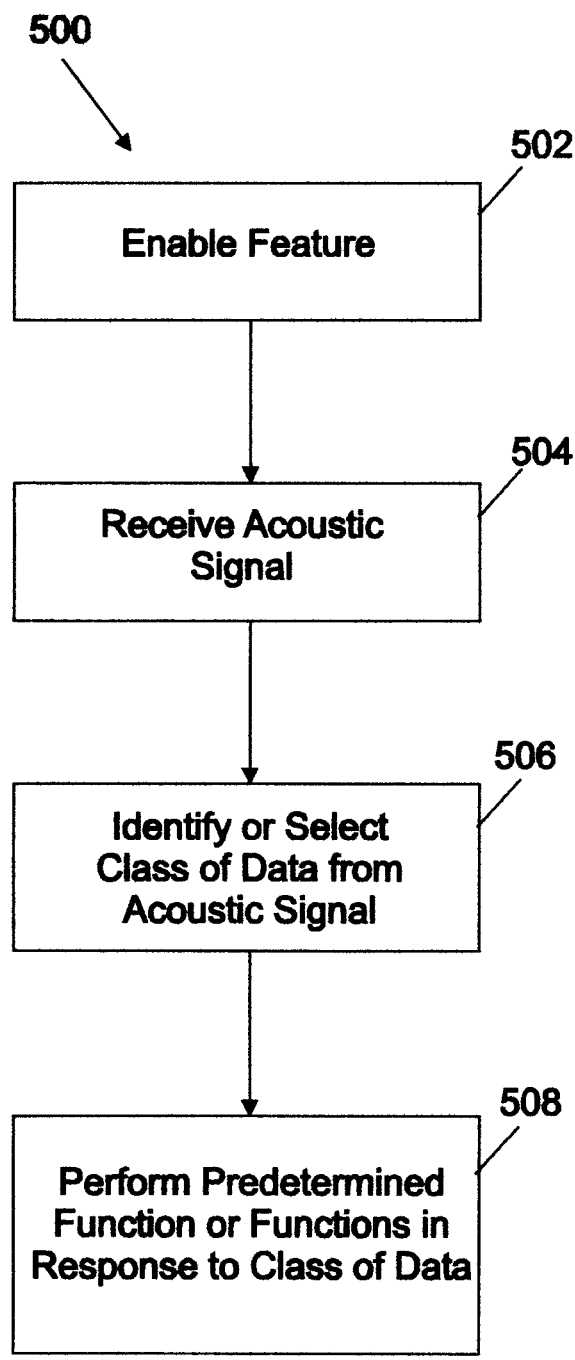
FIG. 5 is a flow chart of an example of a method for communication in accordance with another embodiment of the present invention.

FIG. 5 is a flow chart of an example of a method 500 for communication in accordance with another embodiment of the present invention. The method 500 may be embodied in the communication device 100 of FIG. 1 in the form of a data structure, such as one of data structures 114 or the like, to perform predetermined functions in response to a class of data identified or selected from an acoustic signal. In block 502 the feature or method 500 may be enabled or activated for operation by a communication device. In block 504, an acoustic signal may be received by the device. In block 506, a class of data may be identified or selected from the acoustic signal. Examples of the class of data may include but are not limited to: a phone number, list of phone numbers, a bar code, access information to a web site, a sequence of commands, information associated with a product or service and the like. If the class of data is a sequence of commands, the commands may be performed automatically, or in another embodiment of the present invention, the user may be requested to enter a valid password or code. In block 508, a predetermined function or functions may be performed in response to the class of data. Examples of the predetermined functions or operations may include but are not necessarily limited to ordering a product or service; decoding data from the acoustic signal or signals to reprogram a communication device, such as device 100; downloading communication device setup parameters; storing one or more phone numbers; establishing a call or communications; storing information associated with a web site or email address; accessing a web site; sending an email message and similar operations.

Elements of the present invention may be embodied in hardware and/or software as a computer program code that may include firmware, resident software, microcode or the like. Additionally, elements of the invention, such as methods 200, 300, 400 and 500, may take the form of a computer program product on a computer-usable or computer-readable storage medium having computer-usable or computer-readable program code embodied in the medium for use by or in connection with a device or system, such as device 100 or system 102 of FIG. 1. Examples of such a medium may be illustrated in FIG. 1. A computer-usable or readable storage medium may be any medium that may contain or store the program for use by or in connection with a device or system. The medium, for example, may be an electronic, magnetic, optical, electromagnetic, or semiconductor system or the like.

While the present invention has been described with respect to wireless communication devices and the like, the features described with respect to the present invention are also applicable to communication devices that may be connected to a wired system or network. Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A device for communication, comprising:
an optical sensor to capture an image, the image comprising a class of data embedded in the image, the class of data having an associated predetermined function and comprising at least one of characters and numbers;
a processor configured to:
identify the class of data in the image from a plurality of possible classes of data and
a display to display the class of data;
wherein the processor is further configured to:
receive user input at least one of (i) indicating that the displayed class of data is acceptable, or (ii) indicating that the displayed class of data should be edited and editing the displayed class of data;
receive user input indicating that the displayed class of data should be processed;
in response to receiving the user input indicating that the displayed class of data should be processed, request that the user input a password; and
perform the predetermined function associated with the class of data in response to validating the password.

2. The device of claim 1, wherein the optical sensor comprises one of a charge coupled device, a complimentary metal oxide semiconductor (CMOS) and a camera.

3. The device of claim 1, further comprising a data structure including computer-executable instructions executable by one of the optical sensor and the processor to decode pixels in the image to identify or select the associated class of data.

4. The device of claim 1, wherein the display is further to display the image.

5. The device of claim 1, wherein the plurality of possible classes of data comprise at least one of a phone number, a list of phone numbers, access information to a web site, a sequence of commands, and information associated with a product or service.

6. The device of claim 5, wherein the sequence of commands comprises commands to be performed automatically by a communication device.

7. The device of claim 6, wherein the communication device comprises a cellular telephone.

8. The device of claim 5, wherein the sequence of commands comprises commands to be performed by a communication device in response to a password.

9. The device of claim 8, wherein the communication device comprises a cellular telephone.

10. The device of claim 8, further comprising at least one of a user interface and a voice recognition function to enter the password.

11. The device of claim 1, wherein the optical sensor is operable to capture the image from one of a television, a video monitor, and a fixed medium.

12. The device of claim 1, further comprising a transmitter operable to transmit a signal to order a product or service comprises sending one of a short message service (SMS) message, email message, or voice or data message, each including information associated with a purchaser.

13. The device of claim 1, further comprising a user interface to receive user input comprising at least one of selecting the class of data from the image, storing the class data and transmitting the class of data.

14. The device of claim 1, wherein the class of data comprises data that is visible and intelligible to a human eye.

15. The device of claim 1, wherein the predetermined function comprises one of transmitting a signal to order a product or service, decoding data from one or more images to reprogram a communication device, downloading communication device setup parameters, storing one or more phone numbers, establishing a call, storing information associated with a web site or email address, accessing a web site, and sending an email message.

16. A device for communication, comprising:
an optical sensor to capture an image, the image comprising a class of data embedded in the image, the class of data having an associated predetermined function and comprising at least one of characters and numbers;
a processor, wherein a data structure operable in association with one of the optical sensor, the processor and a mobile system includes computer-executable instructions to identify the class of data from a plurality of possible classes of data in the image by decoding and analyzing pixels in the image;
a display to display the class of data;
a second data structure operable in association with the processor to:
receive user input at least one of (i) indicating that the displayed class of data is acceptable, or (ii) indicating that the displayed class of data should be edited and editing the displayed class of data;
receive user input indicating that the displayed class of data should be processed;
in response to receiving the user input indicating that the displayed class of data should be processed, requesting that the user input a password; and
perform the predetermined function associated with the class of data in response to validating the password; and
a transmitter to transmit signals in response to the class of data.

17. The device of claim 16, wherein the data structure operable in association with one of the optical sensor, the processor and the mobile system includes computer-executable instructions executable by one of the optical sensor, the processor and the mobile system to decode pixels in the image to identify or select the class of data.

18. The device of claim 16, further comprising a storage device to store at least one of the image and the class of data.

19. The device of claim 16, wherein the display is further to display the image.

20. The device of claim 19, further comprising at least one function button to select the class of data from the image.

21. The device of claim 20, further comprising a pointing device to select the class data from the image.

22. The device of claim 16, further comprising a user interface to receive user input comprising at least one of selecting the class data from the image, storing the class of data and transmitting the class of data.

23. The device of claim 16, wherein the class of data comprises at least one of a phone number, a list of phone numbers, access information to a web site, a sequence of commands, and information associated with a product or service.

24. The device of claim 16, wherein the predetermined function comprises one of transmitting a signal to order a product or service, decoding data from one or more images to reprogram a communication device, downloading communication device setup parameters, storing one or more phone numbers, establishing communications, storing information associated with a web site or email address, accessing a web site, and sending an email message.

25. A method for communication, comprising:
capturing an image, the image comprising a class of data comprising at least one of characters and numbers embedded in the image;
identifying a class of data in the image of a plurality of possible classes of data by decoding and analyzing pixels in the image, the class of data having an associated predetermined function;
displaying the class of data;
receiving user input at least one of (i) indicating that the displayed class of data is acceptable, or (ii) indicating that the displayed class of data should be edited and editing the displayed class of data;
receiving user input indicating that the displayed class of data should be processed;
in response to receiving the user input indicating that the displayed class of data should be processed, requesting that the user input a password; and
performing the predetermined function associated with the class of data in response to validating the password.

26. The method of claim 25, further comprising decoding pixels in the image to identify or select the class of data.

27. The method of claim 25, further comprising displaying at least the image.

28. The method of claim 25, wherein identifying or selecting the class of data comprises identifying at least one of a phone number, a list of phone numbers, a bar code, access information to a web site, a sequence of commands, and information associated with a product or service.

29. The method of claim 28, further comprising performing, using a communication device, the sequence of commands automatically.

30. The method of claim 28, further comprising performing, using a communication device, the sequence of commands in response to a password.

31. The method of claim 28, further comprising receiving the password via at least one of a voice recognition system and a user interface.

32. The method of claim 25, further comprising a transmitter operable to transmit wherein transmitting a signal to order a product or service comprises sending one of a short message service (SMS) message, an email message, or a voice or data message, each including information associated with a purchaser.

33. The method of claim 25, further comprising retrieving purchaser information from a data source in response to transmitting a signal to order a product or service.

34. The method of claim 25, further comprising at least one of selecting the class of data from the image, editing the class of data, storing the class of data and transmitting the class of data.

35. The method of claim 25, wherein performing the predetermined function comprises one of transmitting a signal to order a product or service, decoding data from one or more images to reprogram a communication device, downloading communication device setup parameters, storing one or more phone numbers, storing information associated with a web site or email address, establishing a phone call, accessing a web site and sending an email message.

36. A non-transitory computer-readable storage medium having computer-executable instructions, when executed on a computer, allows the computer to perform a method, the method comprising:
   capturing an image, the image comprising a class of data embedded in the image, the class of data having an associated predetermined function and comprising at least one of characters and numbers;
   identifying a class of data in the image of a plurality of possible classes of data by decoding and analyzing pixels in the image;
   displaying the class of data;
   receiving user input at least one of (i) indicating that the displayed class of data is acceptable, or (ii) indicating that the displayed class of data should be edited and editing the displayed class of data;
   receiving user input indicating that the displayed class of data should be processed;
   in response to receiving the user input indicating that the displayed class of data should be processed, requesting that the user input a password; and
   performing the predetermined function associated with the class of data in response to validating the password;
   automatically performing a predetermined function associated with the class of data in response to the class of data being identified in the image, each of the plurality of possible classes of data having an associated predetermined function.

37. The non-transitory computer-readable storage medium having computer-executable instructions for performing the method of claim 36, further comprising decoding pixels in the image to identify or select the class of data.

38. The non-transitory computer-readable storage medium having computer-executable instructions for performing the method of claim 36, wherein identifying or selecting the class of data comprises identifying at least one of a phone number, a list of phone numbers, a bar code, access information to a web site, a sequence of commands, and information associated with a product or service.

39. The non-transitory computer-readable storage medium having computer-executable instructions for performing the method of claim 38, further comprising performing using a communication device, the sequence of commands automatically.

40. The non-transitory computer-readable storage medium having computer-executable instructions for performing the method of claim 38, further comprising performing using a communication device, the sequence of commands in response to a password.

41. The non-transitory computer-readable storage medium having computer-executable instructions for performing the method of claim 36, wherein the method further comprises wherein transmitting a signal to order a product or service comprises sending one of a short message service (SMS) message, an email message, or a voice or data message, each including information associated with a purchaser.

42. The non-transitory computer-readable medium having computer-executable instructions for performing the method of claim 36, wherein performing the predetermined function comprises performing commands contained in the image.

* * * * *

UNITED STATES PATENT AND TRADEMARK OFFICE
CERTIFICATE OF CORRECTION

PATENT NO.         : 8,723,964 B2
APPLICATION NO.    : 10/605172
DATED              : May 13, 2014
INVENTOR(S)        : Ivan N. Wakefield It is certified that error appears in the above-identified patent and that said Letters Patent is hereby corrected as shown below:

In the Claims

Column 12, Line 51, remove "at least".

Signed and Sealed this
Fifteenth Day of July, 2014

Michelle K. Lee
*Deputy Director of the United States Patent and Trademark Office*